US012665773B2

(12) United States Patent
Sethi et al.

(10) Patent No.: US 12,665,773 B2
(45) Date of Patent: Jun. 23, 2026

(54) SYSTEM AND METHOD FOR AUTHENTICATION IN A CLIENT-SERVER CONNECTION USING CHALLENGE APPLIED TO A SECRET KEY

(71) Applicant: Dell Products L.P., Round Rock, TX (US)

(72) Inventors: Parminder Singh Sethi, Ludhiana (IN); Atishay Jain, Meerut (IN); Nithish KN, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 147 days.

(21) Appl. No.: 18/190,165

(22) Filed: Mar. 27, 2023

(65) Prior Publication Data

US 2024/0333533 A1　Oct. 3, 2024

(51) Int. Cl.
H04L 9/32 (2006.01)
(52) U.S. Cl.
CPC ................................... H04L 9/3271 (2013.01)
(58) Field of Classification Search
CPC ............................ H04L 9/3271; H04L 9/3215
See application file for complete search history.

(56) References Cited

U.S. PATENT DOCUMENTS

| | | | |
|---|---|---|---|
| 7,805,583 B1 | 9/2010 | Todd | |
| 8,533,815 B1 * | 9/2013 | Upson ................... | H04L 9/3226 |
| | | | 713/168 |
| 8,751,878 B1 | 6/2014 | Don | |
| 10,509,696 B1 | 12/2019 | Gilderman | |
| 2003/0163739 A1 * | 8/2003 | Armington ........... | H04L 9/3226 |
| | | | 713/186 |
| 2007/0245110 A1 | 10/2007 | Shibayama | |
| 2008/0288560 A1 | 11/2008 | Kaji | |
| 2009/0164853 A1 | 6/2009 | Gokhale | |
| 2010/0049917 A1 | 2/2010 | Kono | |
| 2010/0088396 A1 * | 4/2010 | Armerding ........... | H04L 67/141 |
| | | | 709/227 |
| 2010/0293412 A1 | 11/2010 | Sakaguchi | |
| 2011/0276821 A1 | 11/2011 | Gudlavenkatasiva | |
| 2011/0314470 A1 | 12/2011 | Elyashev et al. | |
| 2013/0268807 A1 | 10/2013 | Spencer | |
| 2013/0318497 A1 | 11/2013 | Tal | |
| 2015/0046352 A1 * | 2/2015 | Blitz ................... | H04W 12/126 |
| | | | 705/318 |

(Continued)

*Primary Examiner* — Jason K Gee
*Assistant Examiner* — Brian William Avery
(74) *Attorney, Agent, or Firm* — Chamberlain, Hrdlicka, White, Williams & Aughtry; Aly Z. Dossa

(57) ABSTRACT

A method for managing an authentication includes establishing, by a server device, a secured network channel with a client, providing, via the secured network channel, a private key to the client, after the providing, obtaining, from the client, a request for establishing a session with the client via a second network channel, in response to the request: sending a challenge request to the client, obtaining a challenge response associated with the challenge request, wherein the challenge response specifies a first challenge answer, performing a challenge processing using a private key to generate a second challenge answer, making a determination, using the first challenge answer and the second challenge answer, that the client is authenticated, and based on the determination, initiating the session with the client.

17 Claims, 6 Drawing Sheets

(56)     References Cited

U.S. PATENT DOCUMENTS

| | | | |
|---|---|---|---|
| 2018/0032280 A1 | 2/2018 | Feigin | |
| 2018/0302226 A1* | 10/2018 | Heimlicher | .......... H04L 63/061 |
| 2020/0226144 A1 | 7/2020 | Chen | |
| 2021/0192366 A1 | 6/2021 | Kadambi | |
| 2021/0374013 A1 | 12/2021 | Prasad | |
| 2021/0397495 A1 | 12/2021 | Prakash | |
| 2023/0281219 A1 | 9/2023 | Lee | |
| 2023/0289325 A1 | 9/2023 | Kurian | |

* cited by examiner

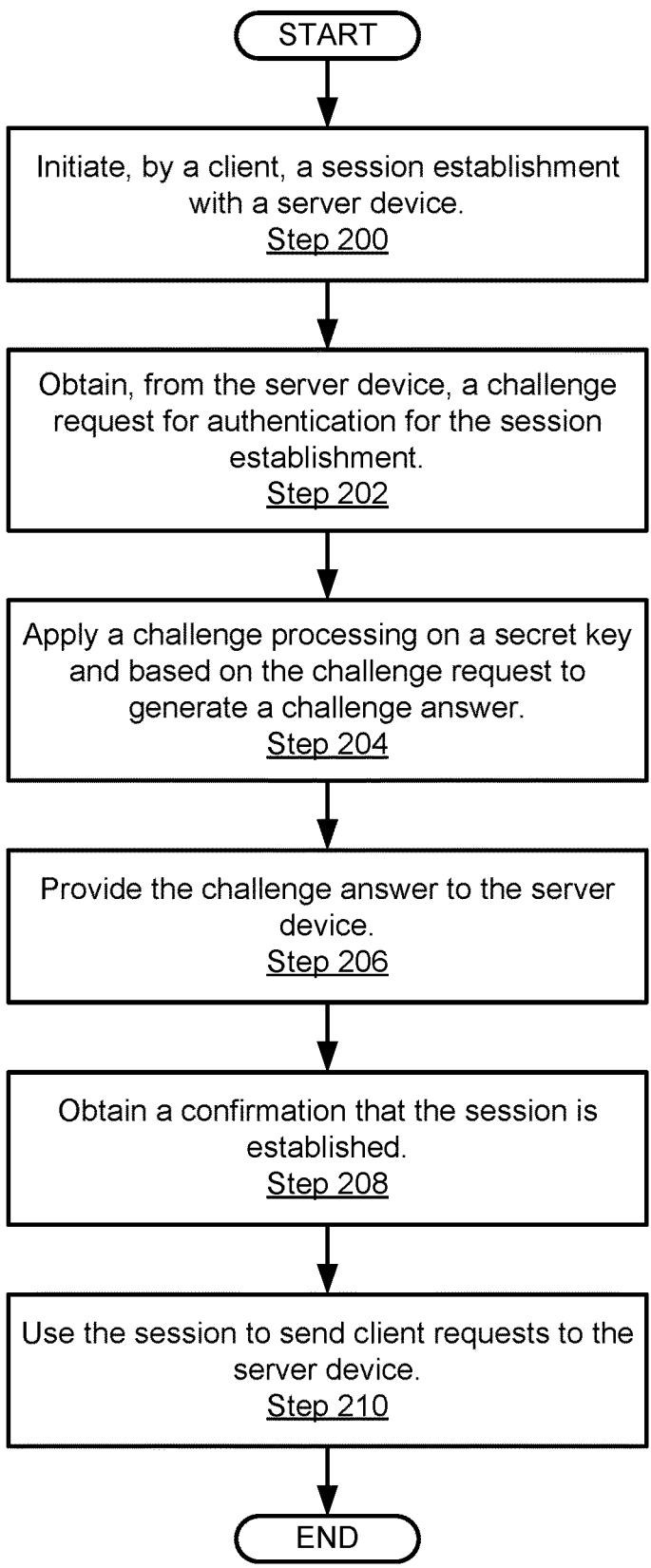
FIG. 2.1

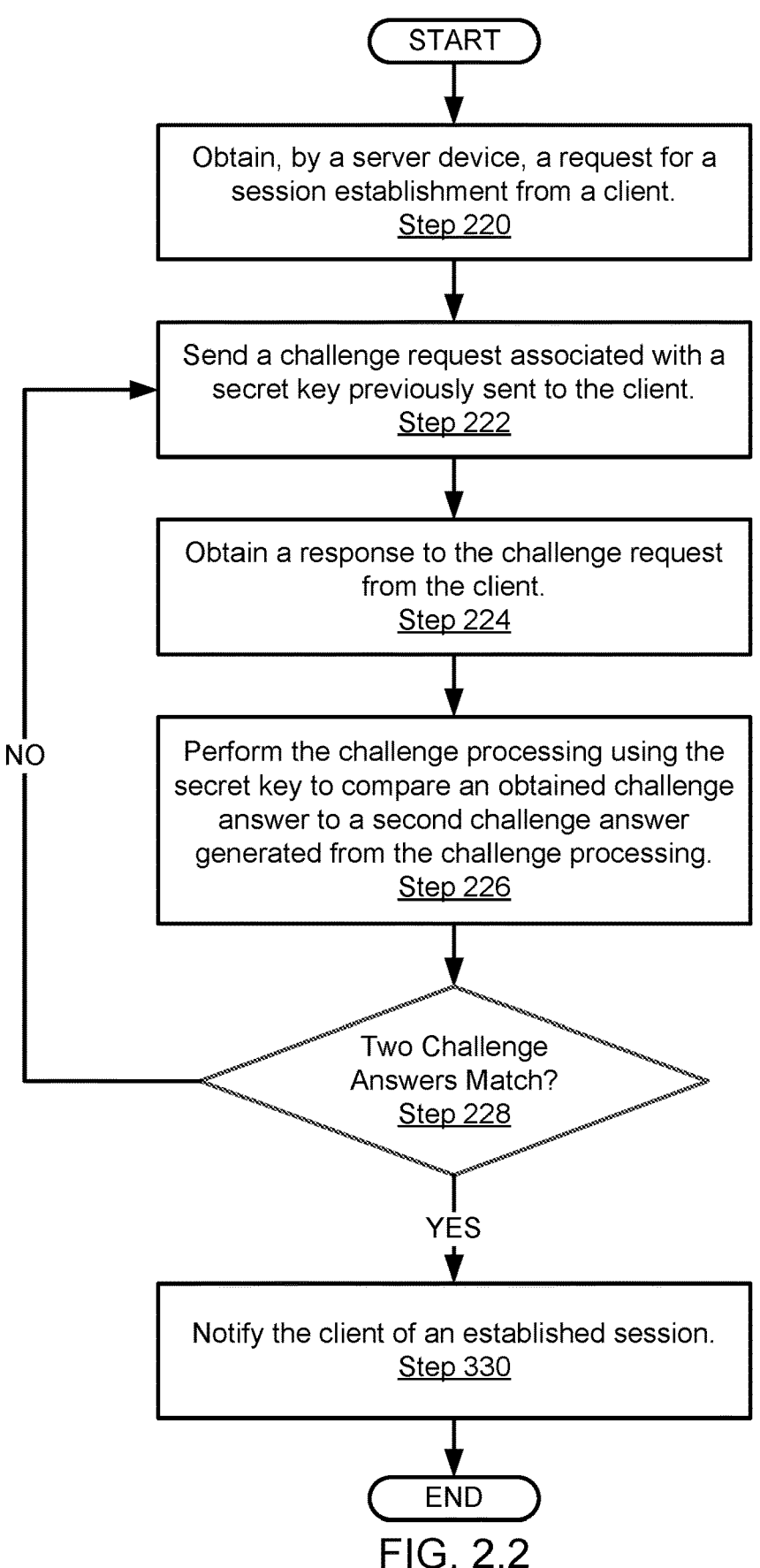
FIG. 2.2

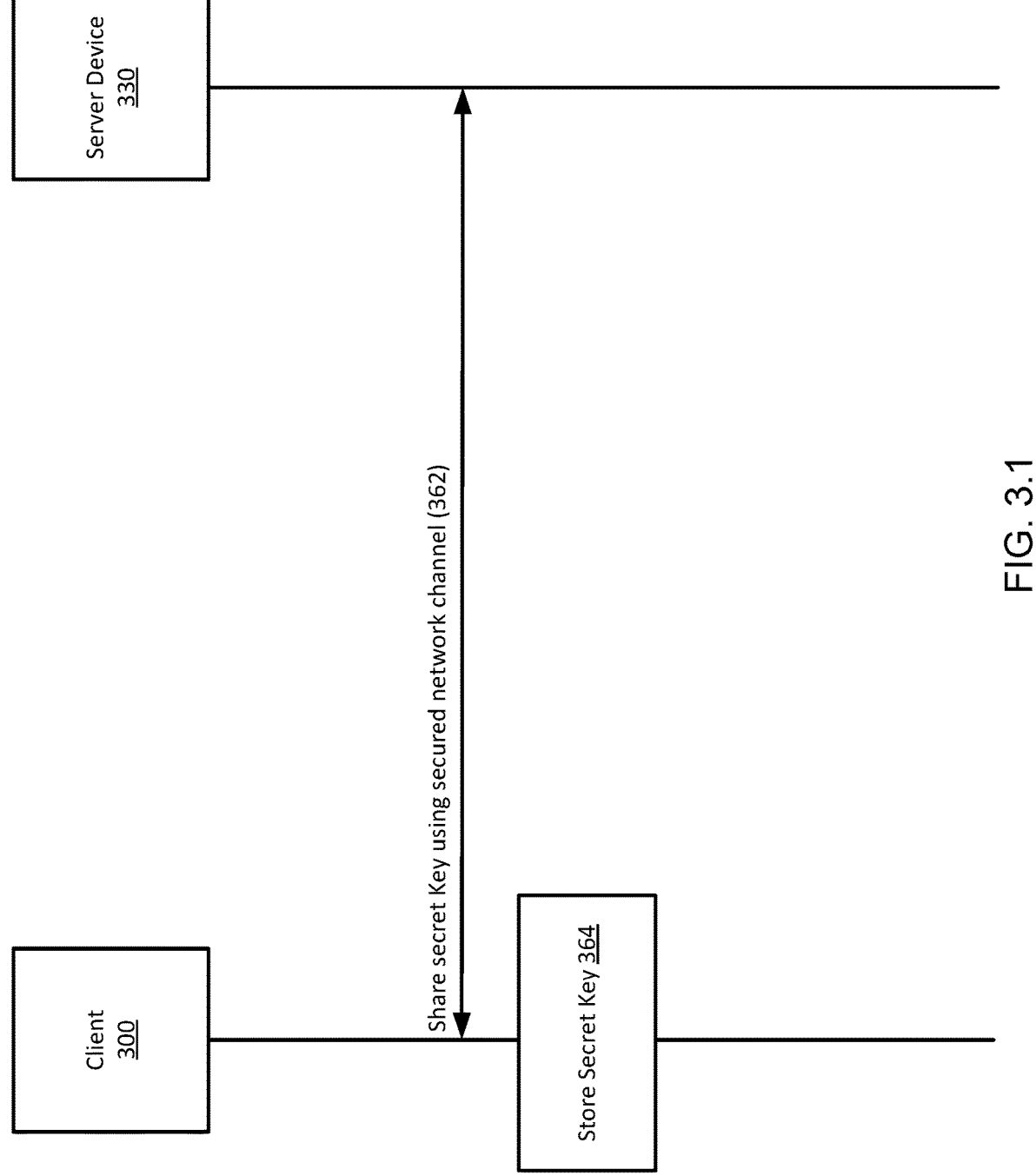
FIG. 3.1

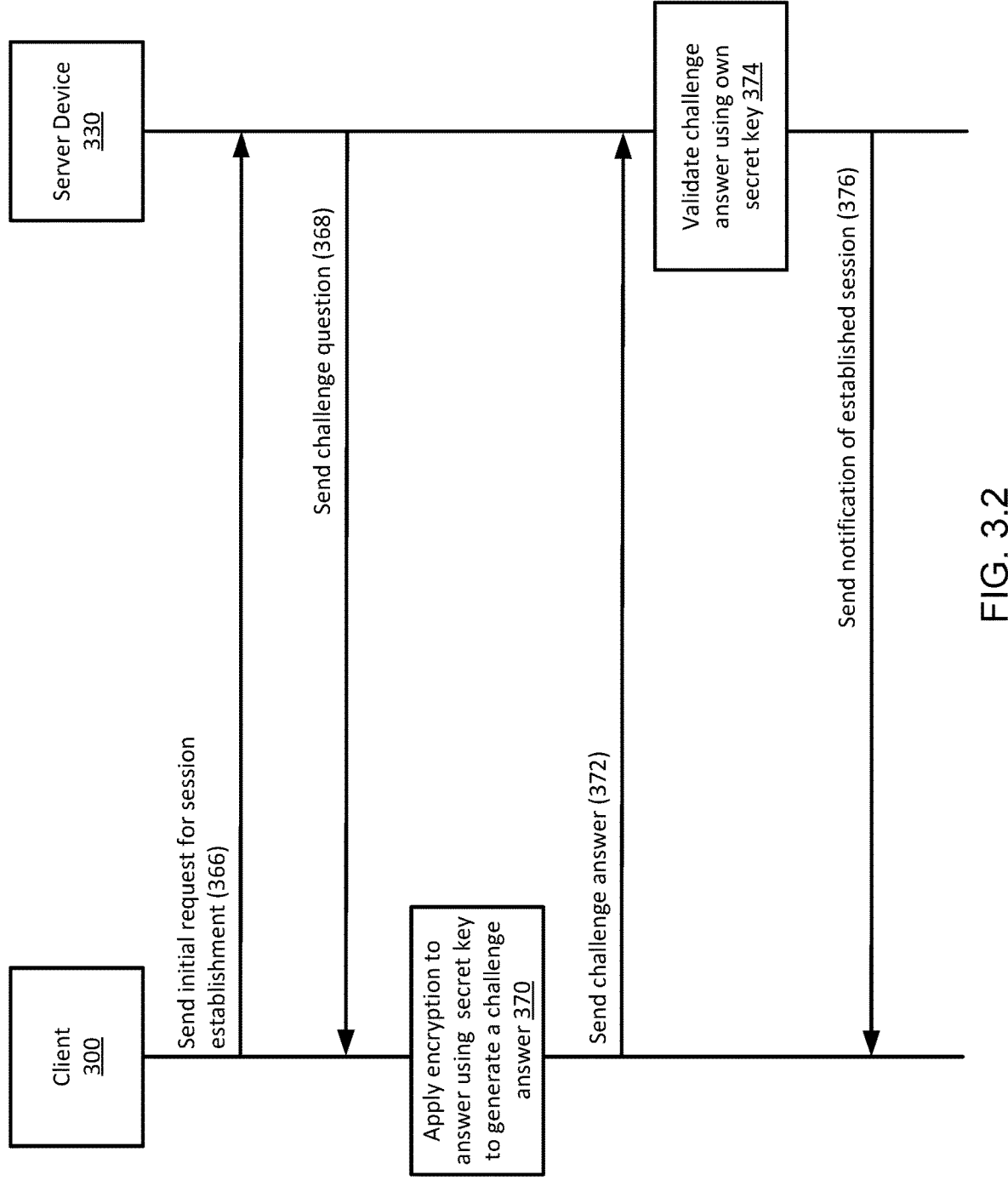
FIG. 3.2

400

SYSTEM AND METHOD FOR AUTHENTICATION IN A CLIENT-SERVER CONNECTION USING CHALLENGE APPLIED TO A SECRET KEY

BACKGROUND

Computing devices may provide services. To provide the services, the computing devices may include hardware components and software components. The software components may store information usable to provide the services using the hardware components.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIG. 2.1 shows a flowchart of a method for establishing a session with a server device in accordance with one or more embodiments of the invention.

FIG. 2.2 shows a flowchart of a method for responding to an attempt to establish a session in accordance with one or more embodiments of the invention.

FIGS. 3.1 and 3.2 show an example in accordance with one or more embodiments of the invention.

DETAILED DESCRIPTION

Figure 1:
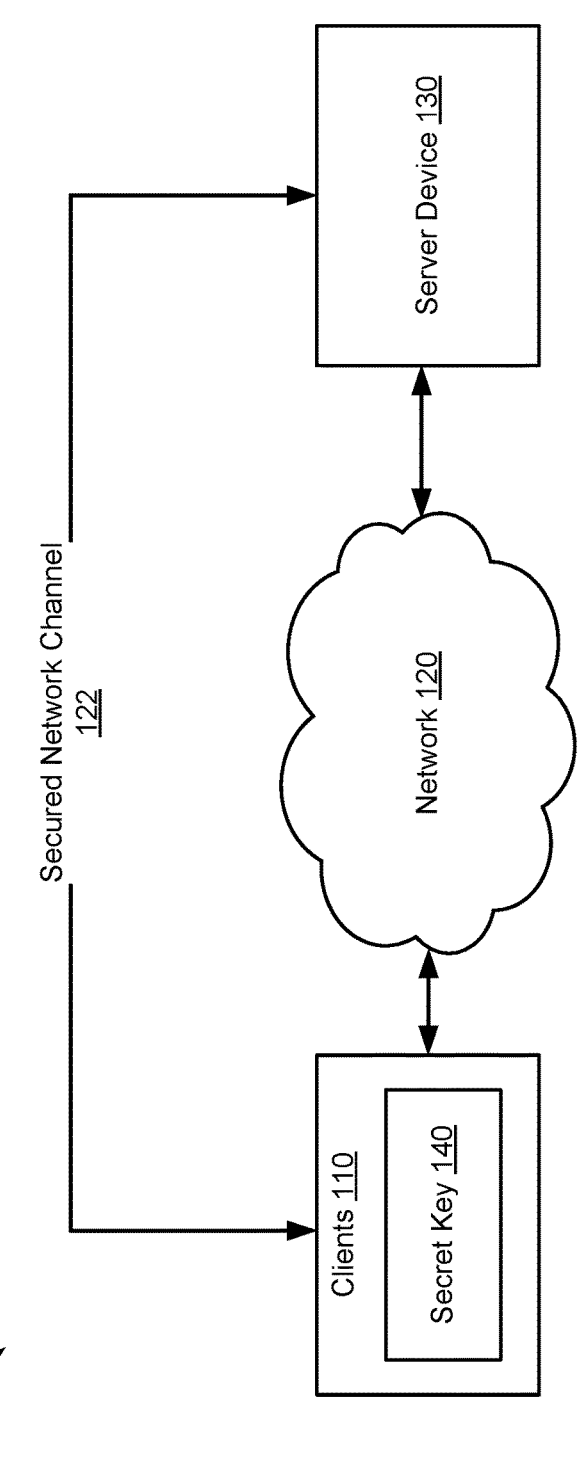
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments of the invention relate to a method and system for managing logical devices. Specifically, embodiments relate to methods and systems for managing an authentication between two devices prior to the use of the services of one of the devices by the other device.

Embodiments disclosed herein disclose systems and methods for an intelligence to perform an authentication of a connection between the client and server without sharing any pre-shared public keys during the connection establishment.

A method for performing embodiments disclosed herein includes sharing a secret authentication key (also referred to as a "secret key") prior to establishing the connection. Initially a secret key is shared between the client and the server though a reduced vulnerability medium such as a secured network channel.

At a later point in time when a session is to be established (e.g., using a second network channel, the client initiates a request to the server without any shared key.

When the handshake request is received by the server, the server identifies the client and shares a one-time challenge with the client. The challenge may be a question that is expected to be processed using the private key. The answer of this challenge is already known to the server and the correct answer to this challenge can be determined by requiring the use of the secret key.

The client upon receiving the challenge generates the answer for the challenge using the pre-shared secret key. Upon determining the answer, the client shares the challenge answer with the server and then the server validates the answer.

Once the answer is validated by the server, the connection is authenticated, and a session is processed ahead for completion.

The following describes various embodiments of the invention.

FIG. 1 shows a diagram of a system (100) in accordance with one or more embodiments of the invention. The system (100) includes any number of clients (110), a network (120), and a server device (130). The system (100) may include additional, fewer, and/or different components without departing from the scope of the invention. Each component may be operably connected to any of the other components via any combination of wired and/or wireless connections. Each component illustrated in FIG. 1 is discussed below.

In one or more embodiments, the server device (130) and the clients (110) may be physical or logical devices, as discussed below. In one or more embodiments, the system (100) may include any number of server devices and any number of clients without departing from the scope of the invention.

While FIG. 1 shows a specific configuration of the system (100), other configurations may be used without departing from the scope of the invention. For example, although the clients (110) and the server device (130) are shown to be operatively connected through the network (120), the clients (110) and the server device (130) may be directly connected, without an intervening network (e.g., 120). As yet another example, although the server device (130) and the target node (150) are shown to be directly connected, the server device (130) and the target node (150) may be executing on the same environment (e.g., a production host environment).

Further, the functioning of the clients (110) and the server device (130) is not dependent upon the functioning and/or existence of the other device(s) in the system (100). Rather, the clients (110) and the server device (130) may function independently, and perform operations locally that do not require communication with other devices. Accordingly, embodiments disclosed herein should not be limited to the configuration of devices and/or components shown in FIG. 1.

In one or more embodiments, the system (100) may deliver computing power and storage capacity as a service to users of the clients (110) via the network (120). The system (100) may also represent a comprehensive middleware layer running on computing devices (e.g., 400, FIG. 4) that supports virtualized application environments. In one or more embodiments, the system (100) may support a virtual machine (VM) environment, and may map capacity requirements (e.g., computational load, storage access, etc.) of VMs and supported applications to available resources (e.g., processing resources, storage resources, etc.) managed by the server device (130). Further, the system (100) may be configured for workload placement collaboration and computing resource (e.g., processing, storage/memory, virtualization, networking, etc.) exchange.

As used herein, "computing" refers to any operations that may be performed by a computer, including (but not limited to): computation, data storage, data retrieval, communications, etc.

As used herein, a "computing device" refers to any device in which a computing operation may be carried out. A computing device may be, for example (but not limited to): a compute component, a storage component, a network device, a telecommunications component, etc.

In one or more embodiments, as being a physical computing device or a logical computing device (e.g., a VM), the server device (130) may be configured for hosting and maintaining various workloads, or for providing a computing environment (e.g., computing power and storage) whereon workloads may be implemented. The server device (130) may also exchange data with other nodes (e.g., other server devices, target nodes, etc.) registered in/to the network (120) in order to, for example, participate in a collaborative workload placement. For example, the server device (130) may split up a request (e.g., an operation, a task, an activity, etc.) with another server device, coordinating its efforts to complete the request (e.g., to generate a response) more efficiently than if the server device (130) had been responsible for completing the request.

One of ordinary skill will appreciate that the server device (130) may perform other functionalities without departing from the scope of the invention. Examples of the server device (130) may include (but not limited to): an enterprise server, a modular server, a blade server, a mainframe, a workstation computer, etc. In one or more embodiments, the server device (130) may be a heterogeneous set, including different types of hardware components and/or different types of operating systems (OSs).

In one or more embodiments, a workload (not shown) may refer to a physical or logical component configured to perform certain work functions. Workloads may be instantiated (e.g., initiated, executed, etc.) and may be operated while consuming computing resources allocated thereto. Examples of a workload may include (but not limited to): a VM, a container, a database, an application, a collection of microservices, etc.

As used herein, a "server" or "server device" may provide computer-implemented services (e.g., receiving a request, sending a response to the request, etc.) to the users. In one or more embodiments, the request may be, for example (but not limited to): a web browser search request, a REST request, a computing request, a database management request, etc. To provide the computer-implemented services to the users, the server may perform computations locally and/or remotely. By doing so, the server may utilize different computing devices (e.g., 400, FIG. 4) that have different quantities of computing resources (e.g., processing cycles, memory, storage, etc.) to provide a consistent user experience to the users.

As used herein, a "database" is an organized collection of structured data, typically stored in a computing system. In most cases, a database is controlled by a database management system, in which the data and the database management system (along with the applications that are associated with them) are referred to as a "database system". Data within the database system (simply "database") is typically modeled in rows and columns in a series of tables to make processing and querying efficient. Most databases use structured query language (SQL) for writing and querying data.

As used herein, a "container" is an executable unit of software in which an application code is packaged, along with its libraries and dependencies, so that it can be executed anywhere. To do this, a container takes advantage of a form of OS virtualization in which features of the OS are leveraged to both isolate processes and control the amount of central processing unit (CPU), memory, and disk that those processes have access to.

Comparing to a VM, a container does not need to include a guest OS in every instance and may simply leverage the features and resources of a host OS. For example, instead of virtualizing the underlying hardware components, a container virtualize the OS, so the container includes only the application (and its libraries and dependencies). The absence of the guest OS makes a container lightweight, fast, and portable.

In one or more embodiments, as being a stateful environment with stateful REST APIs (where the APIs of the same application(s) are interdependent), the server device (130) may include any number of applications (and/or content accessible through the applications) that provide stateful, computer-implemented application services to a user. Applications may be designed and configured to perform one or more operations (e.g., functions, tasks, activities, etc.) instantiated by a user of the server device (130). Examples of an application may include (but not limited to): a word processor, a media player, a web browser, a file viewer, an image editor, etc.

In one or more embodiments, application services may include, for example (but not limited to): database services, electronic communication services, instant messaging services, file storage services, web-based services, desktop-based services, a workload placement collaboration, serving (e.g., processing) a request, sharing an application log, receiving computing resource details of a node, transmitting a request, analyzing data, streaming video, etc.

In order to provide the above-mentioned application services, each application may host similar or different components. The components may be, for example (but not limited to): instances of databases, instances of email servers, etc. Applications may be executed on one or more clients as instances of the applications.

In one or more embodiments, applications may vary in different embodiments, but in certain embodiments, applications may be custom developed or commercial (e.g., off-the-shelf) applications that a user desires to execute in the server device (130). In one or more embodiments, applications may be logical entities executed using computing resources of the server device (130). For example, applications may be implemented as computer instructions, e.g., computer code, stored in persistent storage that when executed by a processor(s) of a computing device (e.g., 400, FIG. 4) cause the computing device to provide the functionality of the applications described throughout this application.

In one or more embodiments, while performing, for example, one or more operations requested by a user, applications installed on the server device (130) may include functionality to request and use physical and logical components (discussed below) of the server device (130). The applications may perform other types of functionalities not listed above without departing from the scope of the invention. In one or more embodiments, while providing application services to a user, applications may store data that may be relevant to the user in storage/memory resources (discussed below) of the server device (130).

In one or more embodiments, in order to provide the above-mentioned application services to a user, applications may need to communicate with one another with a minimum amount of latency. For this reason, in most cases, RESTful APIs (also referred to herein as "REST APIs") are used for communications between applications. As used herein, a "REST API" is an interface that two computing devices use to exchange data securely over the Internet. More specifically, the term "REST" defines a set of rules and constraints (not a protocol or a standard) that need to be followed when building the services. Any application that adheres to those rules and constraints will be able to communicate via a set of uniform, shared, and stateless (or stateful) operators and requests. APIs denote the underlying code that, if it conforms to the set of rules and constraints, allows the applications to communicate with one another.

As used herein, an "API" represents a collection of methods and procedures (e.g., retrieving information about an API source, updating the API source, etc.) that define how applications or computing devices can connect to and communicate with each other. The collection of methods and procedures may be designed and configured to facilitate an application's connection (e.g., access) to one another. In general, the application performing the accessing is called "the client", and the application containing a resource is called "the server".

In operation, REST APIs use Hypertext Transfer Protocol (HTTP) to communicate. More specifically, REST APIs communicate via HTTP to perform standard database functions such as creating, reading, updating, and deleting records within a resource. For example, a well-designed REST API is similar to a webpage executing on a web browser with built-in HTTP functionality.

As used herein, "HTTP" is a request/response protocol that is used in cases in which a synchronous request/response is required. This means that applications (e.g., services) making requests via REST APIs must be designed to expect an immediate response. If the client receiving the response is down, the sending service may be blocked while it awaits for the response. To prevent this, failover and error handling logic may be applied to (e.g., built into) both applications.

In one or more embodiments, there may be four HTTP requests (e.g., methods): (i) "get" requests, (ii) "post" requests, (iii) "put" requests, and (iv) "delete" requests. In one or more embodiments, users may use "get" requests to access resources that are located at a specified uniform resource locator (URL) on a server. They may cache "get" requests and send parameters in a REST API request to instruct the server to filter data before sending. Users may use "post" requests to send data to the server, in which sending the same "post" request multiple times may have a side effect of creating the same resource multiple times. Further, users may use "put" requests to update existing resources on the server. Unlike "post", sending the same "put" request multiple times in a RESTful web service may give the same result. Users may also use "delete" requests to remove the resource. A "delete" request may change the server state; however, if a user does not have appropriate authentication, the "delete" request may fail.

In one or more embodiments, in order to facilitate the communication between applications, two types of REST APIs (e.g., stateless REST APIs and stateful REST APIs) may be used. As used herein, a "state" of a REST API (or an application, for example) specifies its condition or quality of being at a given point in time. In most cases, whether a REST API is stateful or stateless depends on how long the state of interaction with it is being recorded and how that information needs to be stored.

In a REST API architecture, "statelessness" refers to a communication method in which the server completes every user request independently of all previous requests. In this architecture, users may request resources in any order, and every request is stateless or isolated from other requests (e.g., there is no stored knowledge of or reference to past transactions and each request is separate and unconnected). This REST API design constraint implies that servers may completely understand and fulfill each request every time (e.g., each request needs to include all the information necessary to initiate processing). Said another way, stateless REST APIs do not require any server-side sessions and applications are not allowed to store any data related to the requests.

In most cases, stateless applications may provide one service (or function) and use content delivery network, web, or print servers to process these "short-term" requests. An example of a stateless transaction may be an online search operation performed by a user. The user may type a question into a search engine and then hit enter. If this operation is interrupted or ended accidentally, the user may need to start a new operation. This indicates that (i) these two API calls are not dependent on each other and (ii) the result of the first API call not need to be considered to make the second API call.

Further, in the REST API architecture, "statefulness" refers to a communication method in which a current request may be affected by the context of previous requests (e.g., by what happened during previous transactions). This REST API design constraint implies that stateful applications (and processes) may be executed based on the context of previous transactions. For this reason, stateful applications may use the same servers each time they process a request(s) from a user (e.g., a second API call may take a state from a result of a first API call). In this manner, when a stateful transaction is interrupted, the user may continue (more or less) from the point where the user left off because the context and history (e.g., a window location, a setting preference, a recent activity, etc.) have already been stored.

In one or more embodiments, in order to provide computer-implemented services, the server device (130) may include a collection of physical components (e.g., processing resources, storage/memory resources, networking resources, etc.) configured to perform operations of the server device (130) and/or otherwise execute a collection of logical components (e.g., applications, virtualization resources, etc.) of the server device (130).

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a graphical processing unit (GPU), a data processing unit (DPU), etc.

As used herein, a "CPU" may refer to an electronic circuitry that may execute operations specified by an application. A CPU may perform an operation based on the following three steps: (i) fetching instructions related to an operation from the storage/memory resources, (ii) analyzing the fetched instructions, and (iii) performing the operation based on the analysis. In one or more embodiments, an operation may be, for example (but not limited to): comparing numbers, performing a function, displaying a video, etc.

As used herein, a "GPU" may refer to an electronic circuitry that may provide parallel data processing capabilities to generate enhanced, real-time graphics and to perform accelerated computing tasks (which is particularly useful for machine learning (ML) operations). In one or more embodiments, a GPU may include, for example (but not limited to): a graphics memory controller, a video processing engine, a graphics and computation engine, etc.

As used herein, a "DPU" may refer to an electronic circuitry that may perform accelerated data processing and optimized data movement data within each node. In one or more embodiments, the DPU may include, for example (but not limited to): a high-speed (e.g., 200 gigabits per second (200 Gbps)) networking interface, dynamic RAM (DRAM), a multi-core (e.g., 8-core) CPU, programmable acceleration engines (particularly for ML, security, and telecommunications purposes), etc.

In one or more embodiments, a storage or memory resource (not shown) may refer to a measurable quantity of a storage/memory-relevant resource type, which can be requested, allocated, and consumed. A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

As used herein, "storage" may refer to a hardware component that is used to store data (e.g., application data) in each node. Storage may be a physical computer readable medium. In most cases, storage may be configured as a storage array (e.g., a network attached storage array), in which a storage array may refer to a collection of one or more physical storage devices. Each physical storage device may include non-transitory computer readable storage media, in which the data may be stored in whole or in part, and temporarily or permanently.

As used herein, "memory" may be any hardware component that is used to store data in each node. The data stored may be accessed almost instantly (e.g., in milliseconds (ms)) regardless of where the data is stored in memory. The memory may provide the above-mentioned instant data access because the memory may be directly connected to a CPU on a wide and fast bus (e.g., a high-speed internal connection that transfers data among hardware components of the node).

In one or more embodiments, application data may include, for example (but not limited to): a list of instructions, one or more application logs, etc. In one or more embodiments, application logs may include, for example (but not limited to): a setting of an application, a warning/an error (e.g., unknown software exception (0xc00d) occurred in the application at location 0x0007d) occurred in an application, a version of an application, a version of an OS, a display resolution configuration of a client, a type of an OS (e.g., a workstation OS), an identifier of an OS (e.g., Microsoft® Windows), a product identifier of an application, etc.

In one or more embodiments, a "setting of an application" may refer to a current setting that is being applied to an application either by a user or by default. A setting of an application may include, for example (but not limited to): a display option (e.g., a two-sided view) that is selected by a user, a font option that is selected by a user, an inbox folder setting of an electronic mail exchange application, a microphone setting of an application, a background setting of an application, etc.

In one or more embodiments, the server device (130) may include a memory management unit (MMU) (not shown), in which the MMU is configured to translate virtual addresses (e.g., those of a virtual address space (discussed below)) into physical addresses (e.g., those of memory). In one or more embodiments, the MMU may be operatively connected to the storage/memory resources, and the MMU may be the sole path to access the memory, as all data destined for the memory must first traverse the MMU prior to accessing the memory. Further, the MMU may be configured to (i) provide memory protection (e.g., allowing only certain applications to access memory) and (ii) provide cache control and bus arbitration.

In one or more embodiments, while applications provide computer-implemented services to the clients (110), the applications may store data that may be relevant to the clients (110) to the storage/memory resources. When the client-relevant data is stored, the client-relevant data may be subjected to loss, inaccessibility, or other undesirable characteristics based on the operation of the storage/memory resources.

To mitigate, limit, and/or prevent such undesirable characteristics, users of the clients (110) may enter into agreements (e.g., service level agreements) with providers (e.g., vendors) of the storage/memory resources. These agreements may limit the potential exposure of client-relevant data to undesirable characteristics. These agreements may, for example, require duplication of client-relevant data to other locations so that if the storage/memory resources fail, another copy (or other data structure usable to recover the data on the storage/memory resources) of the client-relevant data may be obtained. These agreements may specify other types of activities to be performed with respect to the storage/memory resources without departing from the invention.

In one or more embodiments, each application may include a virtual address space. A virtual address space may be a simulated range of addresses (e.g., identifiable locations) that mimics physical locations of one or more physical components of the server device (130). In most cases, an application is not configured to identify the physical locations of the components; rather, the application relies on other components of the server device (130) to translate one or more virtual addresses of the virtual address space to one or more physical addresses of the physical components. Accordingly, in one or more embodiments, an application may utilize a virtual address space to read, write, and/or otherwise manipulate data, without being configured to directly identify the physical address of that data within the physical components of the server device (130).

Further, each application may communicate with other components of the server device (130) to establish a mapping between a virtual address space and the physical components of the server device (130). In one or more embodiments, when a mapping is established, an application's use of the virtual address space enables the application to directly manipulate data in the physical components, without relying on other components of the server device (130) to repeatedly update mappings between the virtual address space and the physical addresses of the physical components of the server device (130).

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card, a network adapter, a network processor, etc.

In one or more embodiments, a networking resource may provide capabilities to interface the server device (130) with external entities (e.g., the target node (150), the clients (110), etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transmission control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the server device (130) and the external entities. For example, a networking resource may enable the server device (130) to be operatively connected, via Ethernet, using a TCP protocol to form a "network fabric", and may enable the communication of data between the server device (130) and the external entities. In one or more embodiments, the server device (130) may be given a unique identifier (e.g., an Internet Protocol (IP) address) to be used when utilizing the above-mentioned protocols.

Further, a networking resource, when using a certain protocol or a variant thereof, may support streamlined access to storage/memory media of other nodes. For example, when utilizing remote direct memory access (RDMA) to access data on another node, it may not be necessary to interact with the logical components of that node. Rather, when using RDMA, it may be possible for the networking resource to interact with the physical components of that node to retrieve and/or transmit data, thereby avoiding any higher-level processing by the logical components executing on that node.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU, a virtual storage pool, etc.

As an example, a VM may be executed using computing resources of the server device (130). The VM (and applications hosted by the VM) may generate data (e.g., VM data) that is stored in the storage/memory resources of the server device (130), in which the VM data may reflect a state of the VM. In one or more embodiments, the VM may provide services to clients (110), and may host instances of databases, email servers, or other applications that are accessible to the clients (110).

In one or more embodiments, a virtualization resource may include a hypervisor, in which the hypervisor may be configured to orchestrate an operation of a VM by allocating computing resources of the server device (130) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor.

Alternatively, in one or more of embodiments, the hypervisor may be implemented as computer instructions, e.g., computer code, stored on storage/memory resources of the server device (130) that when executed by processing resources of the server device (130) cause the server device (130) to provide the functionality of the hypervisor.

In one or more embodiment, to communicate with the client (110), the server device (130) may include functionality for managing the authentication of one or more connections between the server device (130) and the clients (110). The authentication may be performed by first sending a secret key (140) to one of the clients (110) via a secured network channel (122). The secured network channel (122) may be provided by the network (120) or by another network not shown without departing from the invention. Using the secret key (140), the clients (110) and the server device (130) may authenticate another connection to establish a session for performing services of the server device (130) for the clients (110). The session may be established in accordance with FIGS. 2.1-2.2.

Figure 4:
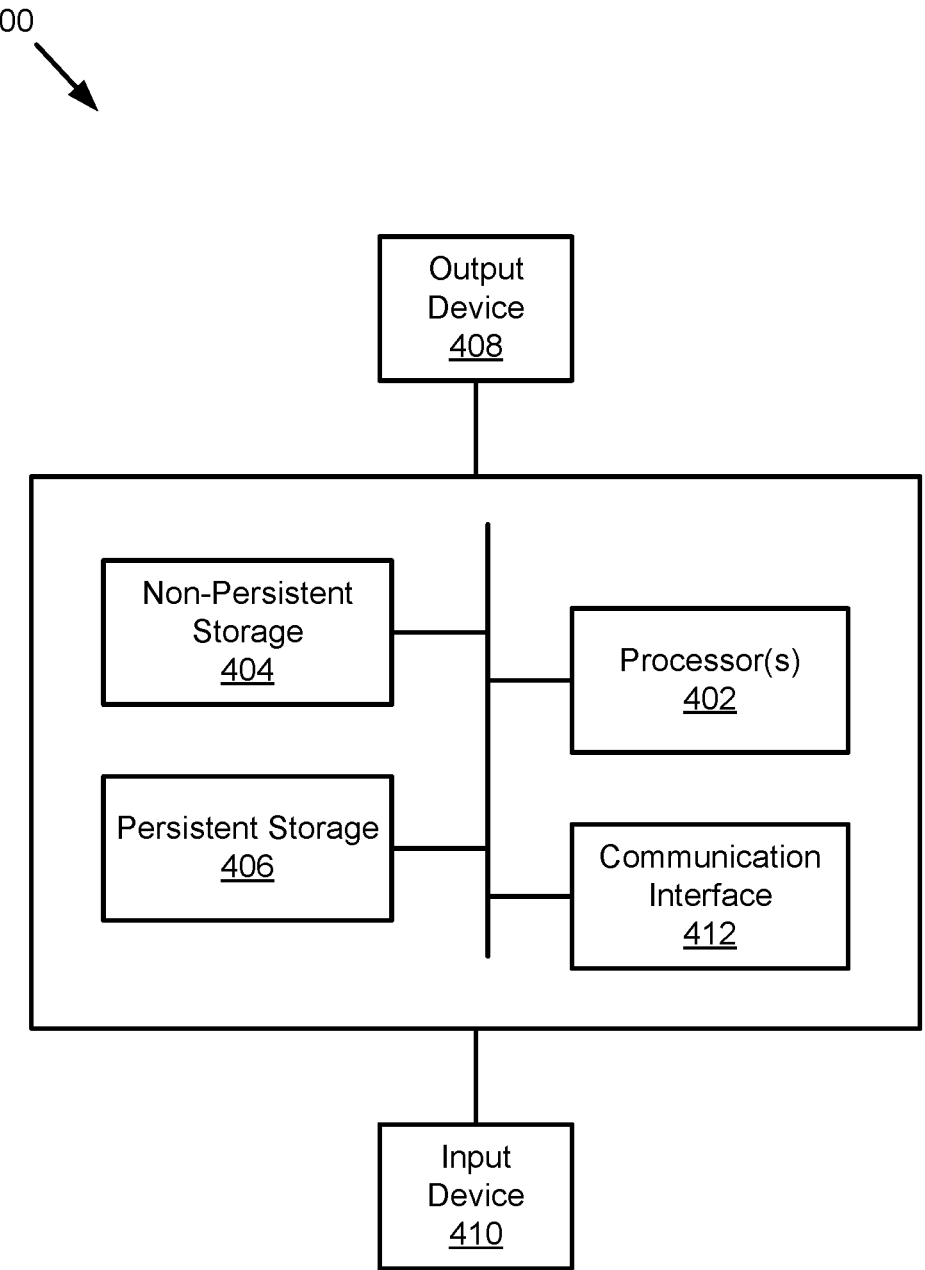
FIG. 4 shows a diagram of a computing device in accordance with one or more embodiments of the invention.

In one or more embodiments, the server device (130) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the server device (130) described throughout this application.

Alternatively, in one or more embodiments, the server device (130) may be implemented as a logical device. The logical device may utilize the computing resources of any number of computing devices to provide the functionality of the server device (130) described throughout this application.

As used herein, "network traffic" is an amount of data moving across a network (e.g., 120) at any given time. For example, in search engine optimization, network traffic may be characterized as being either direct, organic, or paid, in which (i) direct network traffic may be initiated when a user types a website's URL in a web browser (e.g., a computer program for displaying and navigating between web pages), (ii) organic network traffic may be initiated when a user uses a search engine of a web browser to locate information in web pages, and (iii) paid network traffic may be initiated when a user clicks on an advertisement on a web page.

As yet another example, in data center administration, a network traffic may be characterized as either being north-south or east-west, in which (i) north-south network traffic may be client-to-server network traffic that operates between a client and a server and (ii) east-west network traffic may be server-to-server network traffic that operates between servers within a data center.

In one or more embodiments, the clients (110) may provide computer-implemented services to users of the clients (110) (and/or other computing devices such as, other clients or other types of devices). The clients (110) may provide any number and any type of computer-implemented services (e.g., data storage services, electronic communication services, etc.). The clients (110) may be physical or logical devices, as discussed below.

To provide computer-implemented services, entities hosted by the clients (110) may utilize data from any number of resources. For example, the clients (110) may utilize data stored in storage/memory resources of the server device (130). The clients (110) may also utilize data from other resources without departing from the invention.

In one or more embodiments, the clients (110) may issue requests to the server device (130) to (i) receive responses and (ii) interact with various components of the server device (130) (described above). The clients (110) may also request data from and/or send data to the server device (130). Further, the clients (110) may initiate an application to execute on the server device (130) such that the application may (itself) gather, transmit, and/or otherwise manipulate data located on the server device (130), remote to the clients (110). In one or more embodiments, the clients (110) may share access to more than one node and may similarly share any data located on those nodes.

In one or more embodiments, the clients (110) may be implemented as computing devices (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the clients (110) described throughout this application.

Alternatively, in one or more embodiments, similar to the server device (130), the clients (110) may also be implemented as logical devices.

In one or more embodiments, users may interact with (or operate) the clients (110) in order to perform work-related tasks (e.g., production workloads). In one or more embodiments, the accessibility of users to the clients (110) may depend on a regulation set by the administrators. To this end, each user may have a personalized user account that may, for example, grant access to certain data, applications, and computing resources of the clients (110). This may be realized by implementing a "virtualization" technology. Virtualization allows for the generation of a VM that behaves as if it were a physical computing device with its own hardware components. When properly implemented, VMs on the same host (e.g., the client) are sandboxed from one another so that they do not interact with each other, and the data, applications, and computing resources from one VM are not visible to another VM even though they are on the same physical host.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, the GUI may be displayed on a display of a computing device (e.g., 400, FIG. 4) using functionalities of a display engine (not shown), in which the display engine is operatively connected to the computing device. The display engine may be implemented using hardware, software, or any combination thereof. The login screen may be displayed in any visual format that would allow the user to easily comprehend (e.g., read and parse) the listed information.

In one or more embodiments, the network (120) may represent a computing network configured for computing resource and/or messages exchange among registered computing hosts (i.e., the server device (130), the clients (110), etc.). As discussed above, components of the system (100) may operatively connect to one another through the network (120) (e.g., a local area network (LAN), a wide area network (WAN), a mobile network, a wireless LAN (WLAN), etc.). In one or more embodiments, the network (120) may be implemented using any combination of wired and/or wireless connections. Further, the network (120) may enable interactions between the server device (130) and the clients (110) through any combination of wired and/or wireless network protocols (e.g., TCP, UDP, Internet Protocol version 4 (IPv4), etc.).

The network (120) may encompass various interconnected, network-enabled subcomponents (not shown) (e.g., switches, routers, gateways, cables etc.) that may facilitate communications between the components of the system (100).

In one or more embodiments, the network-enabled subcomponents may be capable of: (i) performing one or more communication schemes (e.g., IP communications, Ethernet communications, etc.), (ii) being configured by one or more nodes (e.g., 130, 150, etc.) in the network (120), and (iii) limiting communication(s) on a granular level (e.g., on a per-port level, on a per-sending device level, etc.).

In one or more embodiments, before communicating data over the network (120), the data may first be broken into smaller batches (e.g., data packets) so that larger size data can be communicated efficiently. For this reason, the network-enabled subcomponents may break data into data packets. The network-enabled subcomponents may then route each data packet in the network (120) to distribute the network traffic uniformly.

In one or more embodiments, the network-enabled subcomponents may decide how real-time (e.g., on the order of ms or less) network traffic and non-real-time network traffic should be managed in the network (120). In one or more embodiments, the real-time network traffic may be high priority (e.g., urgent, immediate, etc.) network traffic. For this reason, data packets of the real-time network traffic may need to be prioritized in the network (120). The real-time network traffic may include data packets related to, for example (but not limited to): videoconferencing, web browsing, voiceover Internet Protocol (VOIP), etc.

In one or more embodiments, the non-real-time network traffic may be low priority (e.g., non-urgent) network traffic. For this reason, data packets of the non-real-time network traffic may not need to be prioritized in the network (120). The non-real-time network traffic may include data packets related to, for example (but not limited to): File Transfer Protocol (FTP) for web publishing, email applications, etc.

Turning now to FIG. 2.1, FIG. 2.1 shows a flowchart of a method for establishing a session with a server device in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

In one or more embodiments, the method shown in FIG. 2.1 may be executed by, for example, the above-discussed client (e.g., 110, FIG. 1). Other components of the system (100) illustrated in FIG. 1 may also execute all or part of the method shown in FIG. 2.1 without departing from the scope of the invention.

In step 200, a session establishment with a server device is initiated. In one or more embodiments, the session is established in response to a request by the client to send service requests to the server device via a new network connection between the client and the server device.

In one or more embodiments, the session is initiated after the secret key has been provided by the server device to the client via the secured network channel discussed above.

In step 202, a challenge request is obtained from the server device. In one or more embodiments, the challenge request specifies a question to be answered by the client. The challenge question may be written in a natural language (e.g., English, Russian, German, etc.) readable by a human user. The challenge question may be associated with an answer that is in the natural language. The answer may be determinable by the user of the client.

In step 204, a challenge processing is performed using the answer to the challenge question of the challenge request and using the secret key to generate a challenge answer. In one or more embodiments, the challenge processing is a process for generating the challenge answer by applying a function on the answer and the secret key in order to generate the challenge answer. For example, the function may be an encryption performed on the answer using the secret key. As a second example, the function may be an addition of values associated with the secret key and the answer in order to obtain a value that is associated with the challenge answer. Other functions may be applied to the answer and the secret key without departing from the invention.

In step 206, the challenge answer is provided to the server device. In one or more embodiments, the challenge answer is provided via a challenge response. In one or more embodiments, the challenge response does not include the secret key. In this manner, the secret key is not transmitted during the establishment of this connection.

In step 208, a confirmation of the established session is obtained. In one or more embodiments, the confirmation specifies whether the session is established based on the analysis of the challenge response by the server device.

In step 210, the session is used to send client requests to the server device. In one or more embodiments, after the session is confirmed to be established, the client initiates service requests for processing data in accordance with the functionality of the server device discussed throughout this disclosure.

FIG. 2.2 shows a flowchart of a method for responding to an attempt to establish a session in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

In one or more embodiments, the method shown in FIG. 2.2 may be executed by, for example, the above-discussed server device (e.g., 130, FIG. 1). Other components of the system (100) illustrated in FIG. 1 may also execute all or part of the method shown in FIG. 2.2 without departing from the scope of the invention.

In step 220, a request for a session establishment is obtained from the client. In one or more embodiments, the request obtained in step 220 is the request sent by the client in step 200 of FIG. 2.1.

In step 222, a challenge request is sent to the client. In one or more embodiments, the challenge request includes a challenge question. The challenge question may be determined based on the client that sends the challenge request. In one or more embodiments, the server device may obtain requests for initiating session establishment with multiple clients. In such embodiments, the server device may have a predetermined challenge question (or a predetermined set of two or more challenge questions) associated with each client. The server device may select, from the predetermined set of challenge questions, a challenge question to send. Each challenge question is associated with one challenge answer.

In step 224, a response to the challenge request is obtained from the client. In one or more embodiments, the response is the challenge response sent by the client in step 206 of FIG. 2.1.

In step 226, the challenge processing discussed above is performed using the secret key to compare the obtained challenge response to a generated second challenge response. In one or more embodiments, the challenge processing is identical to the challenge processing discussed in step 204 of FIG. 2.1. In this manner, the same process is performed on the previously-stored secret key of the server device and the pre-defined challenge answer.

In step 228, a determination is made about whether the obtained challenge response matches the second challenge response. If the two challenge responses match, the method proceeds to step 230; otherwise, the method proceeds to step 222.

In step 230, the client is notified of the established session. After the determination that the session is established, the server device sends a notification of the established session. The client may further send service requests to the server device of for using the services offered by the server device. The server device, following the established session, may determine that it authorizes the servicing of the service requests based on the session establishment.

In one or more embodiments, the method may end following step 230.

Start of Example

The following section describes an example of one or more embodiments. The example, illustrated in FIGS. 3.1 and 3.2, is not intended to limit the scope of the embodiments disclosed herein and is independent from any other examples discussed in this application.

Turning now to FIG. 3.1, FIG. 3.1 shows a scenario in which a client wishes to utilize the services offered by a server device. The client (300), at a first point in time, obtains a secret key from the server device (330) using a secured network channel (362). The secured network channel may be an encrypted network tunnel. The secret key is an alphanumerical value. The client (300) stores the secret key (364). The server device (330) also has a copy of the secret key.

Turning to FIG. 3.2, at a later point in time, the client (300) wishes to establish a session with the server device (330) using a network channel that is not the same network channel as the encrypted network tunnel through which secret key was shared. To establish the session, the client (300) sends an initial request for establishing the session (366). The server device (330), in response to obtaining the initial request, sends a challenge question to the client (368). The challenge question specifies the following: "what month is it?". In this example, the answer to the challenge question is "November". The client (300), in response to obtaining the challenge question, applies an encryption to the answer (i.e., "November") using the secret key to generate a challenge answer (370). The challenge answer is sent (372) to the server device (330).

In response to obtaining the challenge answer, the server device (330) validates the challenge answer by applying the same encryption to the string "November" using the stored secret key to obtain a second challenge answer (374). The server device (330) compares the received challenge answer to the second challenge answer to determine that the two challenge answers match. Based on this determination, the server device (330) sends a notification to the client (300) of the established session (376).

Following the notification, the client (300) may now use the services of the server device (330) to send service requests via the second network channel based on the established session in this second network channel.

End of Example

Turning now to FIG. 4, FIG. 4 shows a diagram of a computing device in accordance with one or more embodiments of the invention.

In one or more embodiments of the invention, the computing device (400) may include one or more computer processors (412), non-persistent storage (404) (e.g., volatile memory, such as RAM, cache memory), persistent storage (406) (e.g., a hard disk, an optical drive such as a CD drive or a DVD drive, a Flash memory, etc.), a communication interface (412) (e.g., Bluetooth interface, infrared interface, network interface, optical interface, etc.), an input device(s) (410), an output device(s) (408), and numerous other elements (not shown) and functionalities. Each of these components is described below.

In one or more embodiments, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (e.g., a LAN, a WAN, Internet, mobile network, etc.) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments disclosed above include completing a connection establishment between a client and server without sharing the secret key on the network. The session is established between the client and server without the requirement of transmitting secret keys between the client and the server during the handshake, which reduces overhead between the client and the server. Specifically, the risk of an attack such as a denial-of-service attack during the handshake is reduced by not sharing any vulnerable information during the handshake so that the information shared during the handshake cannot be used for such attacks. Moreover, through this, the entire flow is more protected, or otherwise less prone, to attacks because if the client responds with the wrong answer to the challenge, then a new one-time challenge is produced to the client for establishing the connection.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing an authentication, the method comprising:

establishing, by a server device, a secured network channel with a client;

providing, via the secured network channel, a private key to the client;

after the providing, obtaining, from the client, a request for establishing a session with the client via a second network channel;

in response to the request:

sending a challenge request to the client, wherein the challenge request specifies a question to be answered, wherein the question is associated with a month of a date, and wherein the date corresponds to a point in time in which the request is obtained;

obtaining a challenge response associated with the challenge request, wherein the challenge response specifies a first challenge answer, wherein the first challenge answer is generated by applying a function using both an answer to the question and the private key, and wherein the function is an addition of values associated with the secret key and the first challenge answer;

performing a challenge processing using the private key to generate a second challenge answer;

making a determination, using the first challenge answer and the second challenge answer, that the client is authenticated; and based on the determination, initiating the session with the client, wherein the session is associated with services used by the client device for a stateful application programming interface (API) for an application executing on the server device, and wherein at least one stateful API is used to initiate the session.

2. The method of claim 1, wherein the secured network channel is provided via a first network, and wherein the second network channel is provided via a second network.

3. The method of claim 1, wherein the secured network channel and the second network channel are provided via a network.

4. The method of claim 1, wherein the challenge response does not comprise the private key.

5. The method of claim 1, further comprising:

obtaining a second request for establishing a second session;

in response to the second request:

sending a second challenge request to the client;

obtaining a second challenge response associated with the second challenge request, wherein the second challenge response specifies a third challenge answer;

performing the challenge processing using the private key to generate a fourth challenge answer;

making a second determination that the third challenge answer and the fourth challenge answer do not match;

based on the second determination, sending a third challenge request to the client;

obtaining a third challenge response associated with the third challenge request, wherein the third challenge response specifies a fifth challenge answer;

performing the challenge processing using the private key to generate a sixth challenge answer;

making a third determination that the fifth challenge answer and the sixth challenge answer do match; and based on the third determination, initiating the second session with the client.

6. The method of claim 1, wherein the question is in a natural language, wherein the answer is in the natural language, and wherein the first challenge answer is an alphanumeric value that is not in the natural language.

7. The method of claim 1, wherein the question is associated with one answer that was determined by the user, and wherein the question has already been stored by the server.

8. A non-transitory computer readable medium comprising computer readable program code, which when executed by a computer processor enables the computer processor to perform a method for managing an authentication, the method comprising:

establishing, by a server device, a secured network channel for communication with a client;

providing, via the secured network channel, a private key to the client;

after the providing, obtaining, from the client, a request for establishing a session with the client via a second network channel;

in response to the request:

sending a challenge request to the client, wherein the challenge request specifies a question to be answered, wherein the question is associated with a month of a date, and wherein the date corresponds to a point in time in which the request is obtained;

obtaining a challenge response associated with the challenge request, wherein the challenge response specifies a first challenge answer, wherein the first challenge answer is generated by applying a function using both an answer to the question and the private key, and wherein the function is an addition of values associated with the secret key and the first challenge answer;

performing a challenge processing using the private key to generate a second challenge answer;

making a determination, using the first challenge answer and the second challenge answer, that the client is authenticated; and based on the determination, initiating the session with the client, wherein the session is associated with services used by the client device for a stateful application programming interface (API) for an application executing on the server device, and wherein at least one stateful API is used to initiate the session.

9. The non-transitory computer readable medium of claim 8, wherein the secured network channel is provided via a first network, and wherein the second network channel is provided via a second network.

10. The non-transitory computer readable medium of claim 8, wherein the secured network channel and the second network channel are provided via a network.

11. The non-transitory computer readable medium of claim 8, wherein the challenge response does not comprise the private key.

12. The non-transitory computer readable medium of claim 8, the method further comprising:

obtaining a second request for establishing a second session;

in response to the second request:

sending a second challenge request to the client;

obtaining a second challenge response associated with the second challenge request, wherein the second challenge response specifies a third challenge answer;

performing the challenge processing using the private key to generate a fourth challenge answer;

making a second determination that the third challenge answer and the fourth challenge answer do not match;

based on the second determination, sending a third challenge request to the client;

obtaining a third challenge response associated with the third challenge request, wherein the third challenge response specifies a fifth challenge answer;

performing the challenge processing using the private key to generate a sixth challenge answer;

making a third determination that the fifth challenge answer and the sixth challenge answer do match; and based on the third determination, initiating the second session with the client.

13. The non-transitory computer readable medium of claim 12, wherein the second request is obtained via a third network channel.

14. A system for managing authentication, the system comprising:

a processor comprising circuitry;

memory comprising instructions, which when executed perform a method, the method comprising:

establishing, by a server device, a secured network channel for communication with a client;

providing, via the secured network channel, a private key to the client;

after the providing, obtaining, from the client, a request for establishing a session with the client via a second network channel;

in response to the request:

sending a challenge request to the client, wherein the challenge request specifies a question to be answered, wherein the question is associated with a month of a date, and wherein the date corresponds to a point in time in which the request is obtained;

obtaining a challenge response associated with the challenge request, wherein the challenge response specifies a first challenge answer, wherein the first challenge answer is generated by applying a function using both an answer to the question and the private key, and wherein the function is an addition of values associated with the secret key and the first challenge answer;

performing a challenge processing using the private key to generate a second challenge answer;

making a determination, using the first challenge answer and the second challenge answer, that the client is authenticated; and based on the determination, initiating the session with the client, wherein the session is associated with services used by the client device for a stateful application programming interface (API) for an application executing on the server device, and wherein at least one stateful API is used to initiate the session.

15. The system of claim 14, wherein the secured network channel is provided via a first network, and wherein the second network channel is provided via a second network.

16. The system of claim 14, wherein the secured network channel and the second network channel are provided via a network.

17. The system of claim 14, the method further comprising:

obtaining a second request for establishing a second session;

in response to the second request:

sending a second challenge request to the client;

obtaining a second challenge response associated with the second challenge request, wherein the second challenge response specifies a third challenge answer;

performing the challenge processing using the private key to generate a fourth challenge answer;

making a second determination that the third challenge answer and the fourth challenge answer do not match;

based on the second determination, sending a third challenge request to the client;

obtaining a third challenge response associated with the third challenge request, wherein the third challenge response specifies a fifth challenge answer;

performing the challenge processing using the private key to generate a sixth challenge answer;

making a third determination that the fifth challenge answer and the sixth challenge answer do match; and based on the third determination, initiating the second session with the client.

* * * * *